(12) United States Patent
Nordin

(10) Patent No.: US 12,307,337 B2
(45) Date of Patent: May 20, 2025

(54) FLEXIBLE CONTROL OF MACHINE LEARNING MODEL EXECUTION FOR REAL-TIME EXECUTION ENVIRONMENTS

(71) Applicant: Nasdaq, Inc., New York, NY (US)

(72) Inventor: Jonas Nordin, New York, NY (US)

(73) Assignee: NASDAQ, INC., Rockville, MD (US)

( * ) Notice: Subject to any disclaimer, the term of this patent is extended or adjusted under 35 U.S.C. 154(b) by 159 days.

(21) Appl. No.: 18/110,967

(22) Filed: Feb. 17, 2023

(65) Prior Publication Data

US 2024/0281696 A1  Aug. 22, 2024

(51) Int. Cl.
 G06N 20/00 (2019.01)

(52) U.S. Cl.
 CPC .................................. G06N 20/00 (2019.01)

(58) Field of Classification Search
 None
 See application file for complete search history.

(56) References Cited

U.S. PATENT DOCUMENTS

| 7,739,182 | B2* | 6/2010 | Myr | G06Q 40/06 705/37 |
| 12,045,882 | B1* | 7/2024 | Altunata | G06N 10/00 |
| 2005/0015323 | A1* | 1/2005 | Myr | G06Q 40/06 705/37 |
| 2010/0017647 | A1* | 1/2010 | Callaway | G06F 11/1641 714/48 |
| 2019/0287171 | A1* | 9/2019 | Parmar | G06N 20/00 |
| 2020/0202436 | A1* | 6/2020 | Krishnan | G06N 3/045 |

FOREIGN PATENT DOCUMENTS

CN  105373854 A  *  3/2016

\* cited by examiner

*Primary Examiner* — Charles E Anya
(74) *Attorney, Agent, or Firm* — Nixon & Vanderhye, PC

(57) ABSTRACT

Systems and methods that provide for executing a machine learning model in lockstep with a real-time transaction processing system are described. An example system includes a feature store in a memory, processes storing real-time data, including a clock signal, in designated memory regions in the feature store, and processes controlling the execution of the machine learning model in accordance with the clock signal.

19 Claims, 8 Drawing Sheets

| Msg. content 138 | Other/msg Time 136 | Transaction System Time 134 | Data Type 132 |

FLEXIBLE CONTROL OF MACHINE LEARNING MODEL EXECUTION FOR REAL-TIME EXECUTION ENVIRONMENTS

CROSS REFERENCE(S) TO RELATED APPLICATION(S)

None.

TECHNICAL OVERVIEW

The technology described herein relates to artificial intelligence-based systems and methods. More particularly, the technology described herein relates to controlling the execution of one or more machine learning models used in real-time execution environments.

INTRODUCTION

Real-time systems can have a range of responsiveness requirements. That is, depending on the type of application being run, it may be acceptable for the system to have a range of time delays in responding to a request or completing a transaction. The acceptable response times may range from several minutes, or even longer intervals, to milliseconds, or even shorter intervals. For example, execution environments such as autopilot systems of a moving vehicle, certain robotic systems, and the like, demand millisecond or sub-millisecond response times. High speed transaction processing systems such as, for example, equities, commodities, derivative trading systems and the like also have stringent response time requirements where delays of mere milliseconds, or sometimes even less, can result in transactions being presented for trades in an order different from the order in which they were submitted and thus, among other undesirable effects, reduce the system's reliability and fairness.

One aspect that makes it challenging for systems to satisfy their real-time responsiveness requirements is the interaction by those systems with other systems. For example, machine learning models have historically been run either in a batch model or in a query-response mode that can be too slow for many real-time execution environments. As real-time systems expand into various areas of applications including machine learning, it becomes even more important to improve the capabilities of a real-time execution environment to continue to satisfy its responsiveness requirements even when it interacts with other systems such as, for example, machine learning models.

Accordingly, it will be appreciated that new and improved techniques, systems, and processes for efficient interaction by real-time systems and processes with other systems are continually sought after.

SUMMARY OF EXAMPLE EMBODIMENTS

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

According to one a system comprises a memory and a processing system comprising at least one processor. The memory comprises a feature store, wherein the feature store comprises a plurality of predefined memory regions each of which is configured to store data of a respective data type of a plurality of data types. The processing system is configured to perform operations comprising: running a first process configured to receive data from a real-time transaction engine and to store the received data in the feature store in accordance with a data type of the received data; and running a second process configured to control execution of machine learning model based on a clock signal obtained from the feature store, wherein the machine learning model is configured to use data stored in one or more of the predefined memory regions of the feature store as input.

According to another embodiment a method comprises running a first process configured to receive data from a real-time transaction engine and to store the received data in a feature store in accordance with a data type of the received data, wherein the feature store comprises a plurality of predefined memory regions each of which is configured to store data of a respective data type of a plurality of data types. The method also includes running a second process configured to control execution of machine learning model based on a clock signal obtained from the feature store, wherein the machine learning model is configured to use data stored in one or more of the predefined memory regions of the feature store as input.

According to another embodiment, a non-transitory computer readable storage medium is provided. The storage medium stores computer instructions that, when executed by at least one processor of a processing system, causes that the processing system to perform operations. The performed operations comprise running a first process configured to receive data from a real-time transaction engine and to store the received data in a feature store in accordance with a data type of the received data, wherein the feature store comprises a plurality of predefined memory regions each of which is configured to store data of a respective data type of a plurality of data types; and running a second process configured to control execution of machine learning model based on a clock signal obtained from the feature store, wherein the machine learning model is configured to use data stored in one or more of the predefined memory regions of the feature store as input.

BRIEF DESCRIPTION OF THE DRAWINGS

These and other features and advantages will be better and more completely understood by referring to the following detailed description of example non-limiting illustrative embodiments in conjunction with the drawings of which:

FIG. 1B shows an example message data structure, according to some embodiments of the present disclosure;

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

Example embodiments of the present disclosure enable machine learning models to be used more effectively by real-time transaction processing systems by providing for flexible and dynamic control of execution of the machine learning model(s) in a manner that is lockstep with certain time aspects of the real-time transaction processing system, and at or near real-time with the real-time transaction processing system.

Figure 1A:
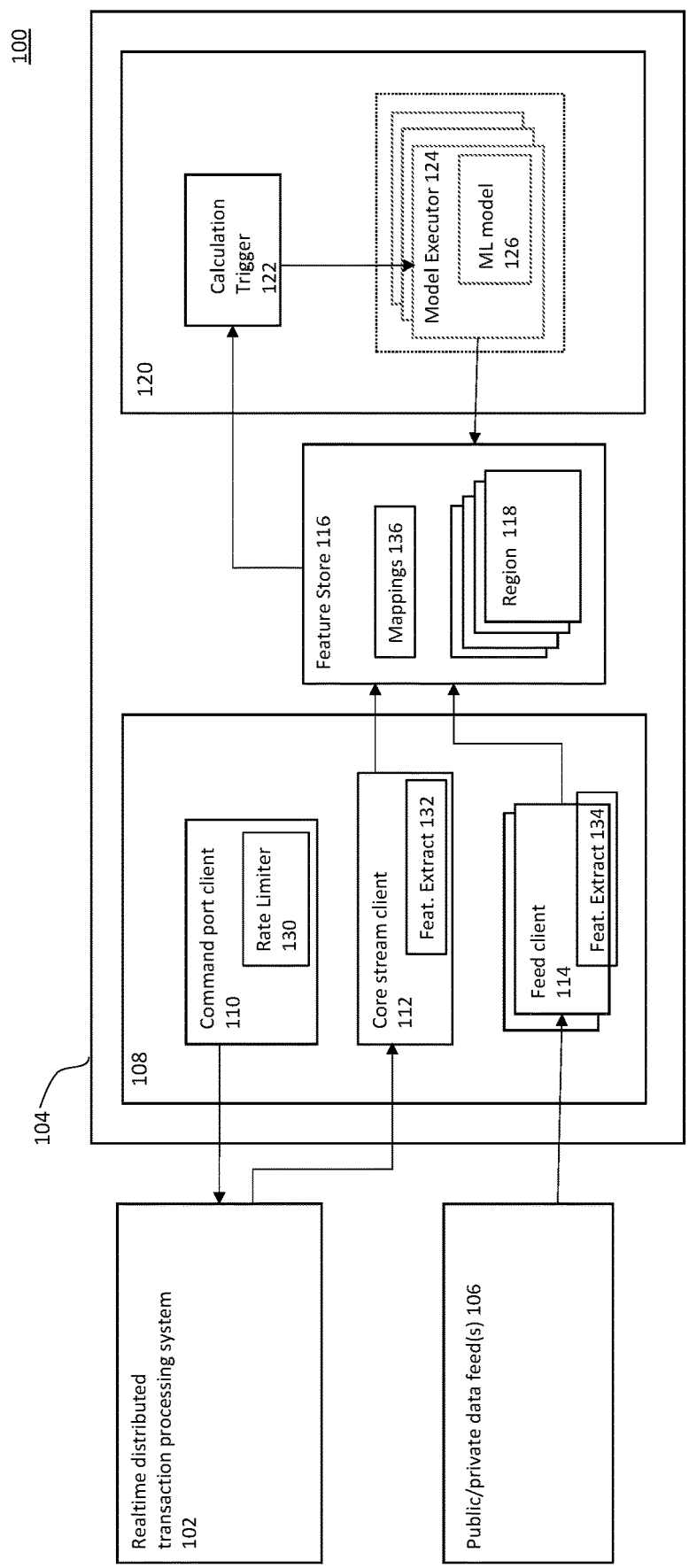
FIG. 1A shows the overall system architecture of an example system for flexible control of machine learning model execution in a real-time execution environment, according to some embodiments of the present disclosure.
Figure 2:
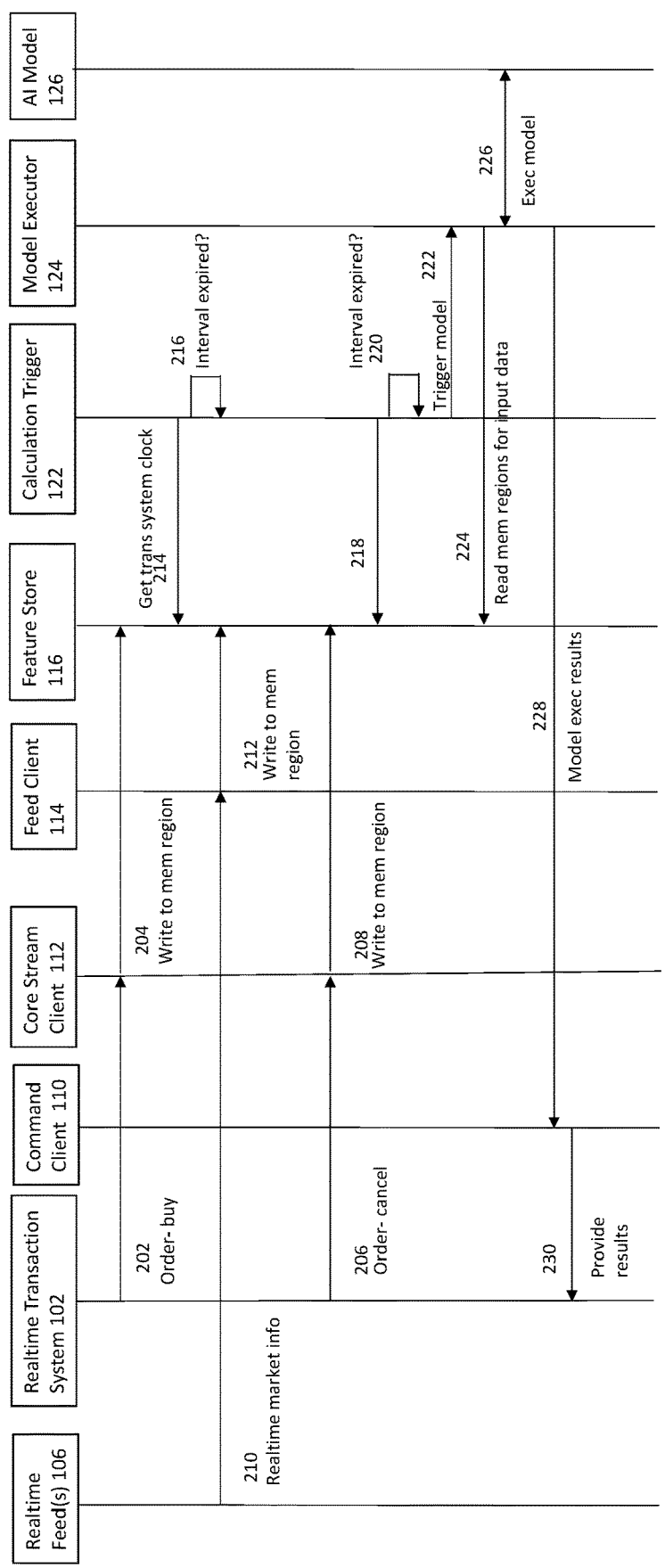
FIG. 2 illustrates an example flow of operations in a system such as the system in FIG. 1A, according to some embodiments of the present disclosure.
Figure 3:
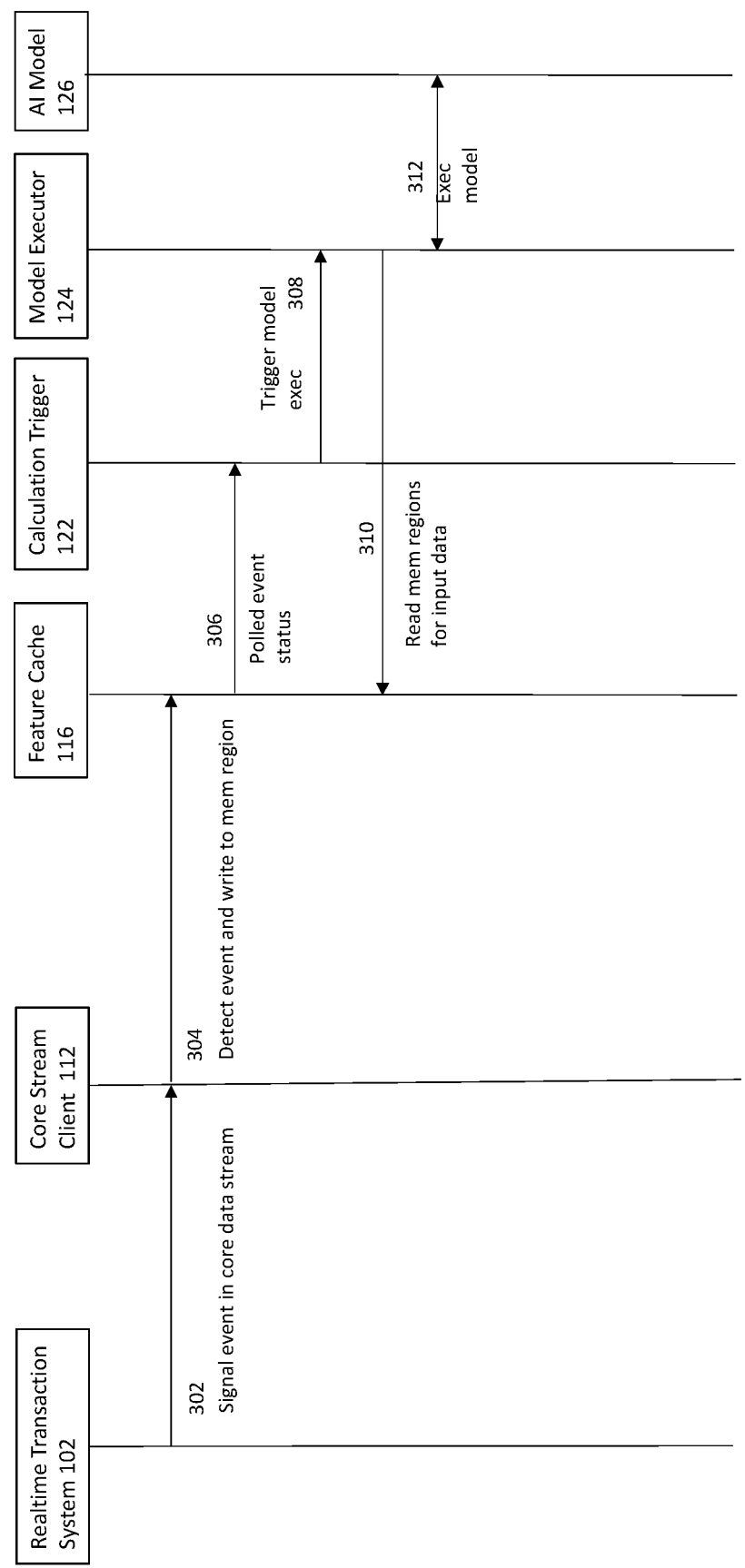
FIG. 3 shows an example in which the feature store is configured to be polled by the machine learning model execution environment for certain events in order to trigger execution of the model, according to some embodiments of the present disclosure.
Figure 4:
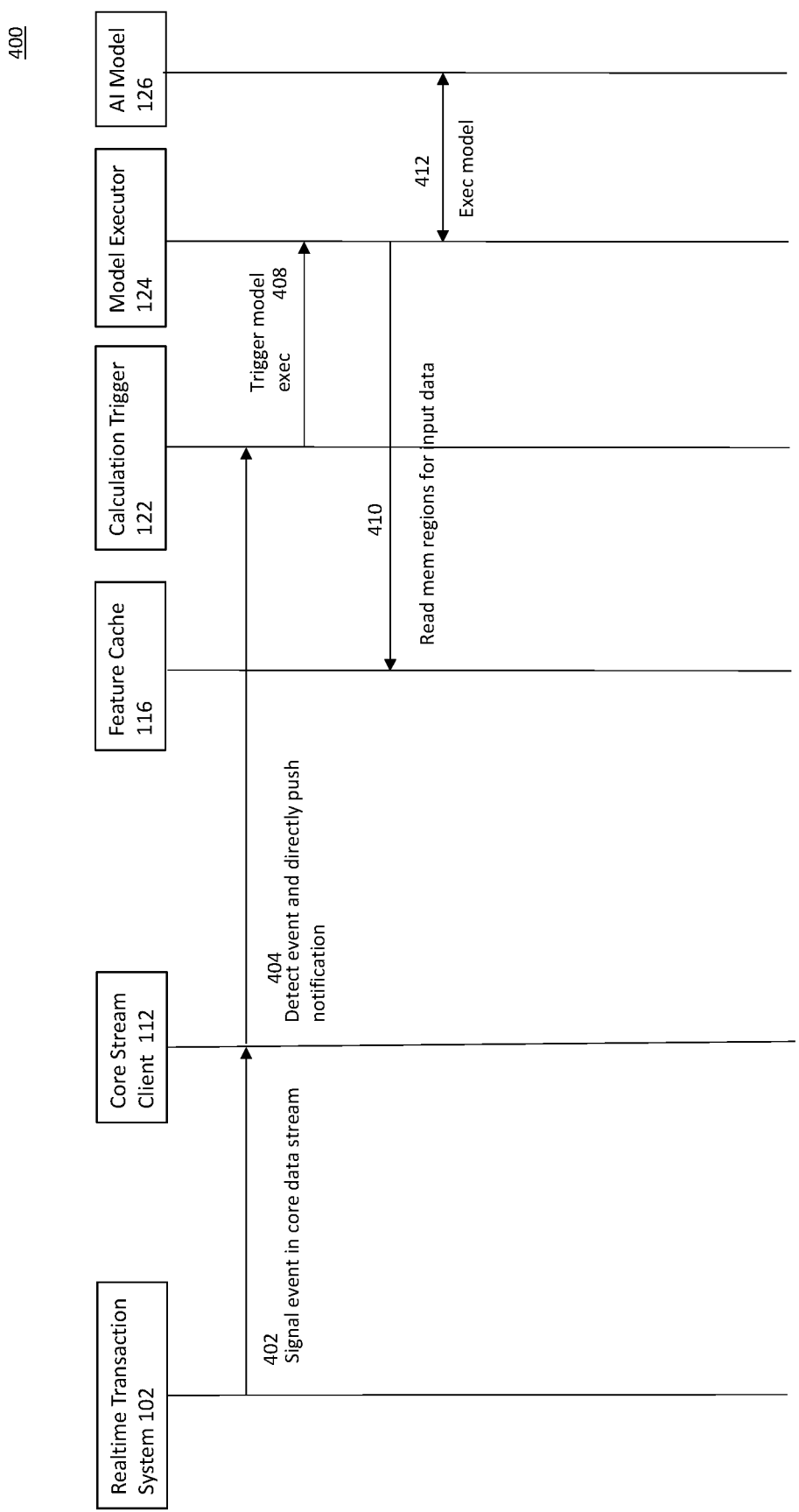
FIG. 4 shows an example process in which event status from the real-time transaction processing system is pushed to the machine learning model execution environment according to come embodiments of the present disclosure.
Figure 5A:
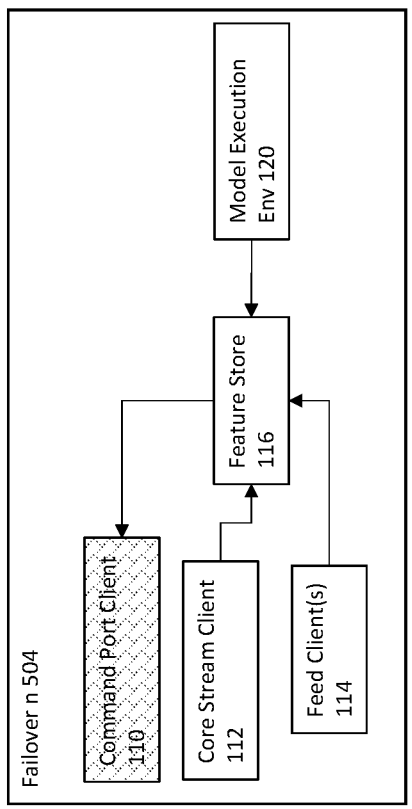
FIG. 5A and FIG. 5B show an example implementation of the model execution environment with concurrent redundant instances, according to some embodiments of the present disclosure.
Figure 5A:
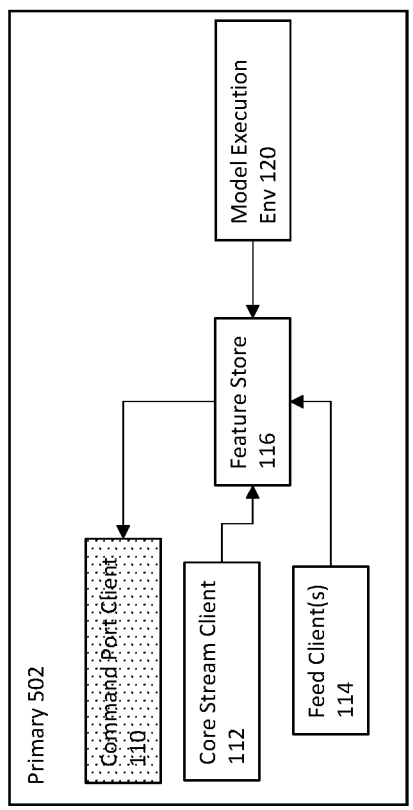
Figure 5A:
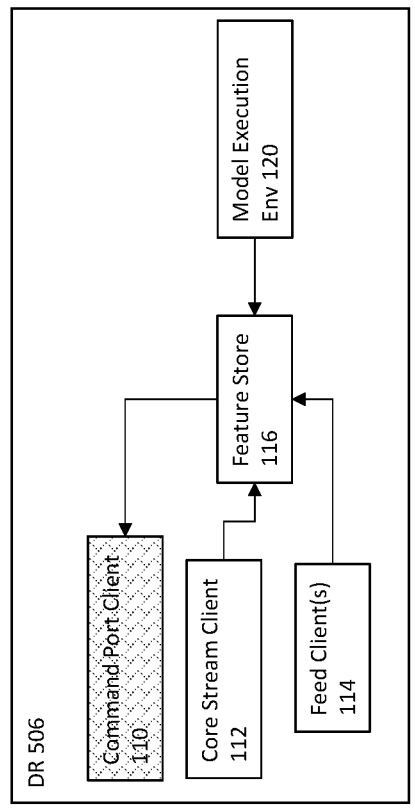
Figure 5B:
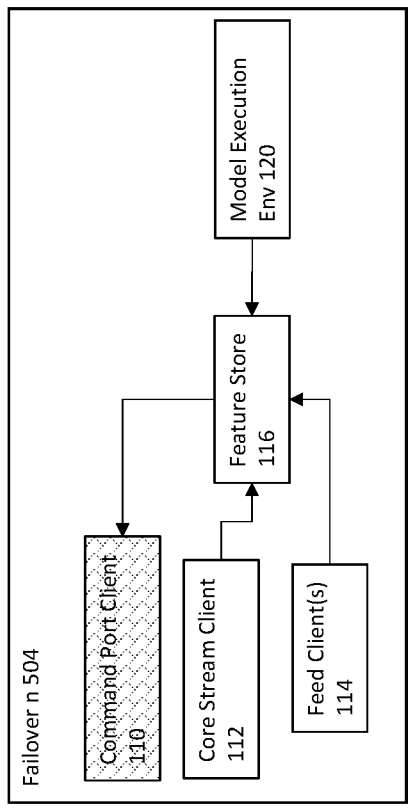
Figure 5B:
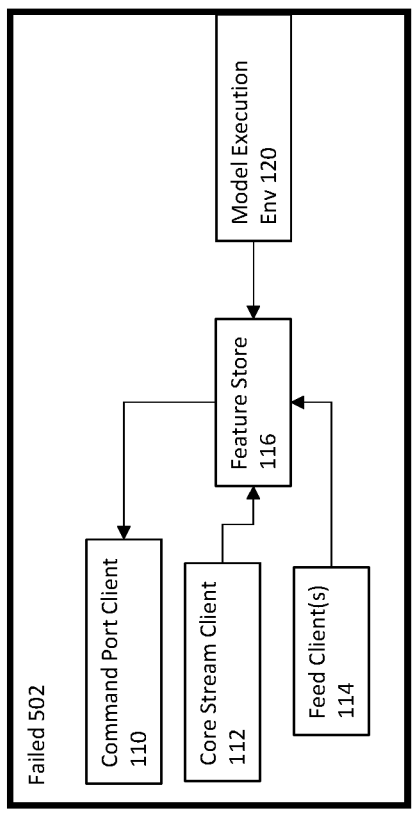
Figure 5B:
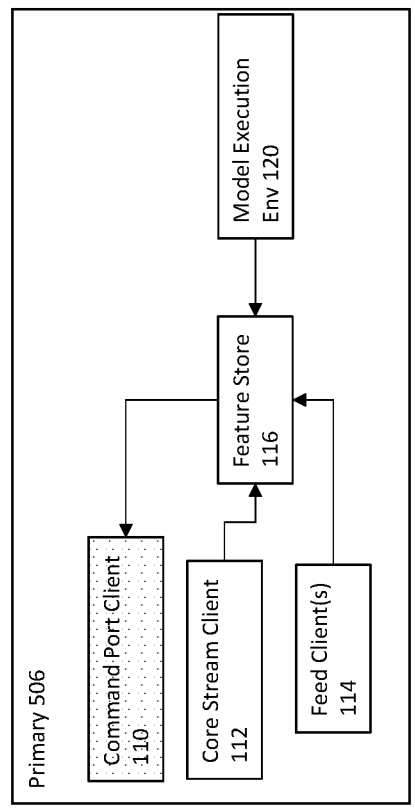
Figure 6:
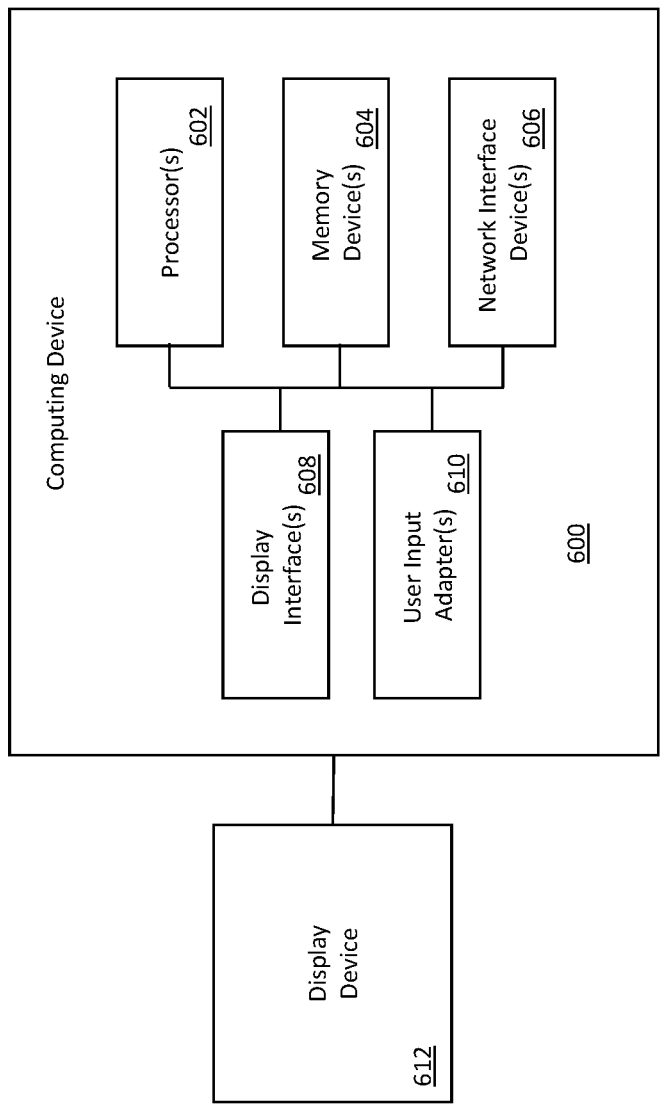
FIG. 6 shows an example computing device that may be used in some embodiments to implement features described herein.

FIG. 1A shows the overall system architecture of an example system for flexible control of machine learning (ML) model execution in a real-time execution environment, according to some embodiments. The example system utilizes a shared memory feature store to convey data from the real-time transaction processing system and other external systems to one or more ML models. A plurality of clients interact with the external systems to receive and package data for consumption by the one or more ML models that is, through the feature store, run in a manner that is lockstep with certain time aspects of the transaction processing model. The time of the transaction processing system can be communicated through a message data structure such as that shown in FIG. 1B. FIG. 2 illustrates an example flow of operations in a system such as the system in FIG. 1A, according to some embodiments of the present disclosure. FIG. 2 shows that a trigger process monitors the feature store for the transaction processing system's time in order to control execution of the one or more ML models. FIG. 3 shows an example in which the feature store is configured to be polled by the ML model execution environment for certain events in order to trigger execution of the model, according to some embodiments. FIG. 4 shows an example process in which event status from the real-time transaction processing system is pushed to the ML model execution environment. FIGS. 5A and 5B show an example implementation of the model execution environment with concurrent redundant instances that enables fast and reliable failover. FIG. 6 shows an example computing device that may be used in some embodiments to implement features described herein In many places in this document, software (e.g., modules, software engines, processing instances, services, applications and the like) and actions (e.g., functionality) performed by software are described. This is done for ease of description; it should be understood that, whenever it is described in this document that software performs any action, the action is in actuality performed by underlying hardware elements (such as a processor and a memory device) according to the instructions that comprise the software. Such functionality may, in some embodiments, be provided in the form of firmware and/or hardware implementations. Further details regarding this are provided below in, among other places, the description of FIG. 6.

Description of FIGS. 1A and 1B

FIG. 1A shows the overall system architecture of an example system 100 for flexible control of ML model execution in a real-time execution environment. As noted above, one of the challenges in an artificial intelligence enabled real-time execution environment such as a real-time transaction processing system is the handling of the substantially long delays in executing some machine learning (ML) models in a manner that is satisfactorily responsive to changing information that is relevant to the real-time transaction processing system. The system of FIG. 1A is a system to deploy, manage, monitor, and run ML models in a real-time system environment. The system provides for state (e.g., the state of transactions in the transaction processing engine) to be shared between the portions interacting with the real-time transaction processing system and the one or more ML models and to execute the model(s) in lockstep with the real-time transaction processing system. In system 100, a ML modelling environment 104 is controlled in a manner that is responsive to incoming information 106 and a real-time transaction processing system 102. By enabling the ML model(s) to execute periodically at configurable intervals, based on the same clock and same state as the real-time transaction processing engine, example embodiments provide for the state of the ML model(s) to be maintained in lockstep with the state of the transaction processing engine while the ML model(s) and the real-time transaction processing engine execute at their own respective speeds/intervals irrespective of whether they are executed by the same processor.

In various embodiments, the real-time transaction processing system 102 may be any type of real-time system. Consistent with the foregoing, in various embodiments the real-time transaction processing system 102 may be any type of real-time system that is, based on one or more ML models, responsive to a stream of real-time input requests and/or other real-time information. In an example real-time transaction processing system 102, the efficiency and reliability of the system may depend at least to some extent on how quickly the system adapts in response to changes in the received inputs and whether it processes (e.g., considers) the incoming inputs in the order they are received. In example embodiments, the real-time transaction processing system 102 may be an autonomous navigation decision system, a robot action control system, a medical decision system, an electronic trading system for equities and/or other assets, etc.

In an embodiment, the real-time transaction processing system 102 is a distributed transaction processing system that is an electronic trading system for trading equities and/or other assets. The system's efficiency and reliability may depend on executing transactions (e.g., buy orders, sell orders, cancel orders, order adjustments, etc.) with minimum delay and in the order that they are received. Both factors, minimum delay and precise ordering, can become challenging when thousands or even millions of transactions enter the transaction processing engine in which the different types of transactions are resolved by matching etc. in short intervals such as a minute, a few seconds, a few milliseconds, or a few microseconds, continuously over relatively long periods such as a several hours. In another embodiment, the transaction processing system 102 may be a decision system in an autonomous driving system in which dynamic streams of camera and other sensor information are received in a continuous manner and the system makes control decisions responsive to the dynamic inputs.

In some example embodiments in which the system 102 is an electronic trading system, the trading may be performed by a real-time transaction processing engine (e.g., matching engine) by using one or more ML models 126 and in a manner that is responsive to a real-time stream of information 106. In one embodiment, the one or more ML models may be configured to provide recommended time intervals for trading one or more categories or types of assets, where the time intervals can be changed dynamically in response to real-time information obtained from the transaction processing engine and/or other real-time information sources. The stream of information may include various market-affecting information such as information regarding trade volumes, prices in other trading facilities, corporate earnings information, market-affecting political or environmental information, etc. In an example embodiment in which system 102 is a control system such as an autonomous driving system, the stream of information 106 may include camera information, other sensor information, or the like.

The model execution environment 120 controls the execution of one or more ML models 126 that takes as input data from one or more streams of information 106, and a stream of information from the transaction processing system 102 and generates outputs that are provided back to the transaction processing system 102 that may in turn use those outputs to adapt its manner of resolving transactions and/or of responding to events. For example, the transaction processing system 102 may change a time interval for resolving certain transactions or for responding to certain events in response to a recommended time interval dynamically generated by the one or more ML models 126 based on real-time data provided to the one or more ML models 126.

In example embodiments, a ML model executor of one or more ML model executors 124 obtains input for a ML model of the one or more ML models 126 from a feature store 116 (also sometimes referred to as "feature cache"). The feature store 116 may include a plurality of individually addressable shared memory regions 118. In some embodiments, the feature store 116 may be a data structure; the feature store 116 may be located in a shared memory, and include a plurality of memory regions 118 that are each reserved to store data of one or more data types. One of the memory regions may be designated to store the clock (e.g., last known time) of the transaction processing system 102. In some embodiments, a mapping 136 specifies a predefined mapping of a respectively different group of one or more data types to each memory region in the feature store 116.

In one embodiment, the mappings 136 maps a respectively different data type to each memory region of the plurality of memory regions. In example embodiments, the memory regions may be of the same size, each a respectively different size, or any combination of sizes.

The feature store 116 may be written into and/or read from multiple memory regions 118 simultaneously.

In the model execution environment 120 a calculation trigger process 122 provides a time-based trigger to cause execution of the one or more ML models 126 by the one or more model executors 124. When triggered to execute, the one or more model executors 124 obtain input data for the one or more ML models 126 from one or more of the memory regions 118 and makes it available for use by the one or more ML models 126. Providing for the ML model(s) to be executed based on the calculation trigger 122 as described above enables the ML model(s) to be in lockstep with the transaction state of the real-time transaction processing system irrespective of whether the model execution environment 120 executes on the same processor as the real-time transaction processing system 102. In some embodiments, the transaction processing system 102 and the model execution environment are executed by processors having different execution speeds.

Whereas the reading from the feature store 116 is performed by the model execution environment 120, the writing to the feature store 116 is performed by one or more real-time interaction client processes 108. Real-time interaction client processes 108 comprise a command port client 110, core stream client 112, and one or more feed clients 114. The command port client 110 is configured to obtain results generated by execution of the one or more ML models 126 and provide them to the real-time transaction processing system 102. The command port client 110 may include capabilities such as a rate limiting capability 130 to enable and/or slowdown the input of new result information from the one or more ML models 126 to the real-time transaction processing system 102. A queue or other memory data structure may be implemented in the command port client process 130 to enable the buffering and rate limiting. In one embodiment, the command port client 110 rate limits the message flow from the ML model(s) 126 to the real-time transaction processing system 102 in accordance with a configurable maximum number of messages per unit time (e.g., a configurable number of minutes, seconds, etc.).

The core stream client process 112 may, in some embodiments, for example, such as in an embodiment in which the real-time transaction processing system 102 is an electronic trading system for equities and/or other assets, may receive a core stream that includes transaction information that describes the state of the transaction processing system 102. For example, the core stream may include all buy orders, sell orders, cancel orders, order adjustments, order completions, order failures, etc. for assets. In some embodiments, the core stream client process includes the entire dynamic state (e.g., state of transactions) of the transaction processing system that is relevant to the one or more ML models 126, and the entire dynamic state is written to one or more memory regions to be available for reading to the model executor 124.

The one or more feed client processes 114 may be configured to monitor private or public data feeds, such as, for example, asset trading information in other facilities, stock market information, corporate information, market-affecting political information, etc.

Each of the client processes 112 and 114 may be configured to detect data of one or more data types in accordance with configuration information and to extract that data. For example, feature extractors 132 and 134 may be configured to extract one or more data types. The extracted data is then written to respective memory regions 118 in the feature store 116 in accordance with the preconfigured mapping 136.

The mapping 136 may be a table in which each row specified a data type and a base address of a memory region 118. The table may be indexed in the data type column. In some embodiments, the index column may be a bit map that can identify one, two or more data types to enable a single row to specify a mapping of a group of data types to one memory region. In some embodiments, instead of, or in addition to the base address, a current address at which to write the next data for the corresponding data type may be indicated at least for some of the memory regions. In association with the mapping 136, or separately from the mapping table, a capability to check and flag out of bounds writing can be implemented in some embodiments. In some embodiments, the data in each memory region is deleted (or is marked as read) when read by the one or more model executors 124. Any type of technique may be implemented to prevent the occurrence of read/write conflicts between the real-time interaction clients 108 and model execution environment 120 when accessing the feature store 116.

The model execution environment 120 includes the calculation trigger 122, the one or more model executors 124 and the one or more ML models 126. The calculation trigger 122 is configured to periodically monitor the current clock of the transaction processing system, as provided by or by accessing in, the feature store 116. The calculation trigger 122 may be configured to compare a preconfigured default execution triggering interval to a difference between a last triggering time and the current time of the transaction processing system 102 as indicated in the feature store 116, and if the interval has been exceeded, then to trigger execution of the one or more ML models 126. In some embodiments, of the one or more model executors 124 are simultaneously triggered to execute respective instances of the same one or more ML models 126 or respectively different ML models 126. As noted above, the one or more model executors 124 may gather input information required by the one or more ML models 126 before the ML model(s) is/are executed. In some example embodiments in which a plurality of ML models 126 are concurrently executed, each ML model 126 may be configured to use a subset of the inputs from the respective memory regions and generate as results respectively different configuration settings and/or recommendations for the transaction processing system 102. In some embodiments, the one or more model executors 124 can, for example, select the inputs necessary for each model of the one or more ML models 126 based on the data types that are consumed by each ML model 126.

The calculation trigger 122, the respective model executors 124 and/or the respective models 126 can be configured to transmit the results generated by the model execution to the command port client process 110 to be provided to the transaction processing model 102. In example embodiments, the command port client process 110 may provide the transaction processing system 102 with the results as (e.g., in the same form) they are received from the model execution environment 120 or may perform processing on the results before providing to the transaction processing system 102.

In some embodiments, the model execution can be triggered by any one of a first one or more predetermined events in the transaction processing system 102. Thus, in some embodiments, the inclusion of a particular predefined data type for such a first predetermined event in the core message stream, or more specifically, the writing to a predefined memory region designated for such a first predetermined event, can enable the calculation trigger 122 to poll for the occurrence of such predetermined events. When such polling by the calculation trigger 122 detects that one of the first predetermined events has occurred, it can responsively start execution of the one or more ML models 126 without waiting for the expiry of the model execution interval.

In some embodiments the model execution can be triggered by the occurrence of any one of a second one or more predetermined events in the transaction processing system 102, by enabling the core stream client 112 to directly cause the calculation trigger 122 to invoke the model executor 124 without waiting for polling and/or the expiry of the model execution interval. As would be understood, the different manners in which the model execution can be started provides for customizing the responsiveness of the system based on the type of event that occurs in transaction processing system 102.

As noted above, the current clock of the transaction processing system 102 is included in at least some of the messages and/or other data that is received at the model execution environment 120 from the transaction processing system 102. A predefined data type being specified, or a field in a fixed location in a message data structure, may identify the clock of the transaction processing system. In some embodiments, in addition to the clock being included in other messages or data in the core data stream, dedicated heartbeat messages may also be included in the core data stream by the transaction processing system with each including its current clock. The current clock of the transaction processing system may be the time provided by a particular hardware processor in the transaction processing system, or a time that is synchronized among two or more processors of the transaction processing system. The core stream client process 112 is configured to detect the clock in the core data stream and update the clock value written in the corresponding designated predetermined memory region.

In an example embodiment, predetermined data types may include a respectively different data type for each different category of order to buy, sell, adjust or cancel an order. In one embodiment, a specific data type is defined for all orders of a particular category of orders for which a time interval for trading is dynamically changed in accordance with results obtained by the execution of the one or more ML models 126. Respectively different data types can also be defined for the market-affecting information provided to the feed client process/processes 114. In some embodiments, the first and second predetermined events may be the receipt as input an order of one or more of the different categories of orders for which respectively different data types are defined.

In example embodiments, the one or more ML models 126 is executed in a lockstep manner with at least certain time conditions in the transaction processing system 102. As noted above, the clock of the transaction processing system 102 is included in at least some of the messages received by clients 112-114 and written to the designated memory region in feature store 116. The model execution environment 120 is configured to obtain the clock of the transaction processing system 102 from the designated memory region in feature store 116. FIG. 1A shows an example message data structure 130 that can be used for messages sent from the core stream client 112 to the feature store 116. According to some embodiments, the message data structure includes a data type field 132, a transaction system clock/time 134, other time 136 and message content 138.

The data type field 132 can specify one or more of a predefined plurality of data types. The data type field 132 of message 130 is used by the feature store 116 to, based on the corresponding mapping provided in mapping table 136, write the message content 138 (or part thereof, or data determined based on the message content 138) to an assigned memory region 118. As described above, the mapping table 136 assigns a particular memory region 118 to each group of one or more data types.

The transaction system clock field 134 carries the current time of the real-time transaction processing system 102. In some embodiments, the transaction system clock may be specified only using message data structures 130 that are identified as a clock data type. In some other embodiments, other messages (e.g., order initiation, order cancel, order update, etc.) may have a data type field 132 that does not specifically identify a clock, but the receiver (e.g., the feature store 116) expects the transaction system clock to be specified in a designated field in the message data structure. In some embodiments, the core stream client 112 may receive periodic dedicated messages specifying the current transaction system clock. The transaction system time is written by the core stream client 112 to a designated memory region that is preassigned to the transaction system time. The message content field 138 can be written to a memory region identified by the mapping as being assigned to the data type of that message data structure. The message content field 138 may specify order details (e.g., parties to the transaction, type and amount of asset to trade, etc.).

Some embodiments may have message data structures 130 that, in addition to the transaction system clock 134, additionally include another time component 136. The other time component 136 may be the system time when the message content was created or generated.

The one or more ML models 126 takes input from the respective memory regions 118 of the feature store (or the corresponding data as read and processed by the model executor 124 for use by the ML model(s) 126) and calculates one or more configuration settings that can be provided to the real-time transaction processing system 102. The one or more ML models 126 may be based on "machine learning" or "deep learning". "Machine learning" and "deep learning" as the terms are used in this disclosure, refer to different artificial intelligence (AI) learning techniques. Machine learning (ML) is a subset of AI that enables systems to learn from input data, identify patterns and make decisions with minimal human intervention. A ML model learns from a training dataset to make predictions on a test dataset, which may comprise yet unseen data. Deep learning (DL) is a subset of ML that enables machines to learn by example. Deep learning algorithms enable systems to recognize intricate patterns in the data on their own by using multiple processing layers. In one embodiment, "deep learning" refers to machine learning algorithms that use neural networks having a plurality of levels layers of nonlinear processing nodes for feature extraction and transformation. Each layer of the plurality of layers uses the output from the preceding layer as input. In general, the DL neural network's accuracy may increase with the number of layers, which is a measure of the depth of the neural network. Machine learning is considered to require less processing power and is faster than deep learning. Deep learning, while generally requiring more processing power than machine learning, yields results that are generally more accurate than machine learning.

Command port client process 110, core stream client process 112, feed client process(es) 114, calculation trigger 122, model executor(s) 124 and ML model(s) 126 may, in some embodiments, be implemented as respective process executing as separate threads or processes. The command port client process 110, core stream client process 112, feed client process(es) 114, calculation trigger 122, model executor(s) 124 and ML model(s) 126 may execute on the same or different processors in a processing system that may have one or more processors. In some examples in this disclosure, the core stream client process, the calculation trigger, command port client process, feed client process(es) and model executor(s) are referred to as first process, second process, third process, fourth process(es) and fifth process(es), respectively.

It should be understood that the software segments shown in FIG. 1A and other figures are stored in and executed by hardware components (such as processors and memories), and it should be further understood that, whenever it is described in this document that a software segment performs any action, that is done solely for ease of description, and the action is in actuality performed by the underlying hardware elements (such as a processor and a memory device) according to the instructions and data that comprise the software segment. Further details regarding example hardware components that may be used to implement the features described herein are provided below with reference to FIG. 9, as well as elsewhere in this document.

In some embodiments, for example, the data may be hosted on any of a private cloud, community cloud, public cloud or hybrid cloud, and the software associated with the system 100 can be provided in accordance with a software-as-a-service model. It is to be understood that although this disclosure includes descriptions of particular computing environments, implementation of the teachings recited herein are not limited to those particular computing environments. Rather, embodiments of the present invention are capable of being implemented in conjunction with any type of computing environment now known or later developed.

Description of FIG. 2

FIG. 2 illustrates a flow of operations 200 in a system such as the system 100 above, according to some embodiments. The operations flow 200 illustrates the command port client process 110, core stream client process 112, feed client process(es) 114, feature store 116, calculation trigger 130, model executor(s) 124, and the ML model(s) 126, interacting with the real-time transaction processing system 102 and one or more feed streams 106.

The feature store 116, as noted above, is written to by client processes 112-114 that receive messages or data from the real-time transaction processing system 102 or feeds 106 and is read by the model executor(s) 124 or other process associated with the ML model(s) 126. In the illustrated embodiment, the core stream client process 112 receives transaction-related messages (e.g., order initiation 202, order cancel 206, etc.) and in response writes (204 and 208) the relevant information from the messages to the feature store 116. The relevant information from messages 202 and 206 is written to one or more memory regions 118 that are assigned to the data type associated with each of those messages. The feed client(s) 114 receive other related information 210 from one or more real-time feeds 106 and writes the information 212 to a corresponding memory region 118 of the feature store 116 in accordance with the data type included in the respective messages. Processes 112 and 114 may perform parsing/processing of the data received from the real-time sources before writing to the feature store, in order to package that data in a manner that is optimal for consumption by the ML model(s) 126. In some embodiments, the core stream client process 112 and the feed client(s) 114 may perform processing such as aggregating (e.g., calculating one or more of a minimum, maximum, average, mean, etc.) of the data received during a time interval and stored the processed data in the feature store in a manner that the stored data can be used by the model with little, if any, additional processing. This model-specific parsing/processing of incoming data before the feature store is updated improves the performance of the model 126 because in many embodiments the ML model(s) 126 is slower than the client processes 112 and 114.

In one embodiment, messages 202 and 206 each identify the same data type designating a particular equities order category. Message 202 is a buy order, and message 206 is a cancel for the buy order. Message 210 identifies a different data type that designates market-affecting information for the particular order category. The data from messages 202 and 206 are written to a first memory region that is assigned to the data type for the particular equities order category, and the data from message 210 is written a second memory region that is assigned to the different data type that designates market-affecting information for the particular order category.

According to an embodiment, all messages from the transaction processing system 102, including messages 202 and 206, include the current clock (clock 134) of the transaction processing system 102, and the core stream client process 112 writes the current clock of the transaction processing system in the memory region 118 designated for the transaction system clock. The transaction system clock recorded in the clock data field 134 may be referred to as a clock signal.

The calculation trigger process 122 periodically (e.g., every 1 ms or other configurable period) checks the memory region designated for the transaction system clock in memory regions 118 in the feature store. For example, at operation 214 the transaction system clock signal is read and at operation 216 it is determined that the execution interval timer has not expired. However, when checked at the next regular interval at operation 218, the calculation trigger 122 determines that the execution interval timer at 220 has expired. When it is determined that the calculation trigger has expired, then the calculation trigger 122 invokes 222 the model executor(s) 124.

The model executor(s) 124, when invoked by the calculation trigger 122, prepares the execution environment for the ML model(s) 126 execution. The preparation may include reading one or more designated memory regions 118 to read the feature data stored therein. As described above, memory regions 118 contain the latest data received from the transaction processing system 102 and/or feeds 106 for each type of data that corresponds to a data type having a designated memory region. In some embodiments, orders received for each category of orders may be stored in a respective designated memory region.

Subsequently, the model executor(s) 124 runs (executes) the ML model(s) 126 in the execution environment 120.

In the above described example, ML model(s) 126 may use as input the data that is present in the first memory region and the second memory region. As noted above in the example, the first memory region is assigned to the data type for the particular equities order category, and the second memory region is assigned to the different data type that designates market-affecting information for the particular order category. Based on the input information, the model(s) may generate, as the result 228 of the model execution, an updated time interval for the transaction processing system to perform trades of the particular asset category.

After the model(s) 126 have completed the run, or at intermediate intervals during the run, the calculation trigger 122, the model executor(s) 124 and/or the model(s) 126 may send the results 228 of the model execution to the command port client process 110. The command port client process 110 is configured to provide the results 228 or processed results (e.g., a subset of results) 230 to the transaction processing system 102. The transaction processing system 102 may use the received results or information derived from the results to adapt its processing in accordance with suggestions that are provided in the model's results.

Description of FIG. 3

FIG. 3 shows an example embodiment in which feature store 116 is configured to be polled by the model execution environment 120 for certain events in order to trigger execution of the model(s) 126. In some embodiments, the calculation trigger 122 performs the polling.

This is different from the manner in which the model calculation was triggered in the embodiment shown in FIG. 2. In FIG. 3, process 300, the transaction processing system 102 may send certain types of messages for which the calculation trigger 122 polls the feature store 116 at regular predetermined intervals. For example, a message 302 from the real-time transaction processing system 102 causes the core stream client 112 to write message 304 to the feature store 116. The message 304 may have a particular data type for which the calculation trigger 122 is configured to poll 306 the feature store 116.

In some embodiments, feature store 116 may be configured to, when data of the particular data type is written or when information is written to the corresponding memory region 118, to automatically push a notification to the calculation trigger 122.

The calculation trigger 122, in response, invokes 308 the model executor(s) 124. The model executor(s) 124 may proceed to read 310 the relevant data from the feature store 116 and execute 312 the ML model(s) 126. The invoking of the model executor(s) 124, reading of data from the feature store 116 and the execution of the model(s) 126 may be similar to that described in relation to FIG. 2.

Description of FIG. 4

FIG. 4 shows an example process 400 in which an event status from the transaction processing system 102 is pushed to the calculation trigger 122 according to some embodiments of the present disclosure. Pushing of an event status 402 to the calculation trigger 122 can be employed in order to ensure a faster response from the model(s) 126.

The core stream client process 112 obtains an event status update 402 from the transaction processing system 102. The event status update 402 may be for a particular type of event that is identified as a high priority event that requires a fast response. The particular type of event may, for example, be identified by a dedicated data type value.

When the core stream client process 112 receives an event status update 402 and recognizes that it is for an event type that is for a predetermined high priority event type, the core stream client process 112 may push a notification 404 to the calculation trigger 122.

The calculation trigger 122, may then trigger 408 the model executor(s) 124 to execute the model(s) 126. Before starting the execution 412 of the model 126, the model executor(s) 124 may obtain 410 data required for the execution from the feature store 116. The invoking of the model executor(s) 124, reading of data from the feature store 116 and the execution of the model(s) 126 may be similar to that described in relation to FIG. 2.

It should be noted that in some example embodiments, when an event status update is received for a high priority event (for example, in the scenarios shown in FIG. 3 or in FIG. 4), the model executor(s) 124 may obtain the information in only a subset of the memory regions, where the subset is determined based on configuration setting identifying a set of data types (and hence a set of memory regions mapped to those data types) that can affect configuration of the transaction processing system 102 in view of the high priority event. Accordingly, the model(s) 126 may be run more efficiently with improved response times to adapt the transaction processing system 102 in view of such an event status update for a high priority event.

Description of FIGS. 5A and 5B

FIG. 5A shows an example implementation of the model execution environment, according to some embodiments. The system environment shown in FIG. 5A has three concurrently executing instances of the system (e.g., ML modelling environment 104 shown in FIG. 1) running concurrently. The three instances are identified as the primary instance 502, designated backup instance 506, and failover instance 504.

Each of the three instances 502, 504 and 506 runs its own command port client process 110, core stream client process 112 and feed client process(es) 114 for communicating with the real-time transaction processing system 102 and real-time private/public feeds 106. Each of the instances also runs its own instance of the feature store 116 and model execution environment 120. As shown in FIG. 1, the model execution environment 120 includes the model executor 124, the model 126 and the calculation trigger process 122.

FIG. 5A shows a scenario where all three instances are running (i.e., a scenario where no failure condition has occurred). FIG. 5B shows a scenario where instance 502, which was operational previously has failed. Instance 506 is now the primary, and instance 504 remains the backup. The state change of instance 506 to primary from secondary (and the state change of instance 504 to secondary from primary) may be performed automatically upon detection of a failure.

It should be noted that in some embodiments the only difference between the instances is that only one of the instances, specifically the instance elected as the primary at any given time, operates to transmit messages including the results of model execution to the real-time transaction processing system 102, or otherwise provide information from the model execution environment 120 to the real-time transaction processing system 102.

In an example embodiment, the election of the primary can be performed using a consensus election between all active instances. Since, in some embodiments, the only state change that is required in transitioning backup to primary (or vice versa) is some state in the respective command port client processes 110 to enable or disable the command port client's sending result data etc. to the real-time transaction processing system.

It is noted that, although having one or more duplicate systems as shown in FIG. 5A-5B is more costly with respect to processing resources, it provides for a highly reliable failover (e.g., because availability of multiple failover systems) and a very fast failover (e.g., because failover requires only electing a new primary node and changing a state in the respective command port clients).

Description of FIG. 6

One or more computer systems 600 of FIG. 6 can be, for example, used to implement the ML modelling environment 104 shown for example in FIG. 1. FIG. 6 is a block diagram of an example computing device 600 (which may also be referred to, for example, as a "computing device," "computer system," or "computing system") according to some embodiments. Computing device 600 may in some embodiments, includes one or more of the following: one or more processors 602 (which may be referred to as "hardware processors" or individually as a "hardware processor"); one or more memory devices 604; one or more network interface devices 606; one or more display interfaces 608; and one or more user input adapters 610. Additionally, in some embodiments, the computing device 600 is connected to or includes a display device 612. As will explained below, these elements (e.g., the processors 602, memory devices 604, network interface devices 606, display interfaces 608, user input adapters 610, display device 612) are hardware devices (for example, electronic circuits or combinations of circuits) that are configured to perform various different functions for the computing device 600. In some embodiments, these components of the computing device 600 may be collectively referred to as computing resources (e.g., resources that are used to carry out execution of instructions and include the processors (one or more processors 602), storage (one or more memory devices 604), and I/O (network interface devices 606, one or more display interfaces 608, and one or more user input adapters 610). In some instances, the term processing resources may be used interchangeably with the term computing resources. In some embodiments, multiple instances of computing device 600 may arranged into a distributed computing system.

In some embodiments, each or any of the processors 602 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 602 uses an instruction set architecture such as x86 or Advanced RISC Machine (ARM).

In some embodiments, each or any of the memory devices 604 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 602). Memory devices 604 are examples of non-transitory computer-readable storage media.

In some embodiments, each or any of the network interface devices 606 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), LTE Pro, Fifth Generation New Radio (5G NR) and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, data is communicated over an electronic data network. An electronic data network includes implementations where data is communicated from one computer process space to computer process space and thus may include, for example, inter-process communication, pipes, sockets, and communication that occurs via direct cable, cross-connect cables, fiber channel, wired and wireless networks, and the like. In certain examples, network interface devices 606 may include ports or other connections that enable such connections to be made and communicate data electronically among the various components of a distributed computing system.

In some embodiments, each or any of the display interfaces 608 is or includes one or more circuits that receive data from the processors 602, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 612, which displays the image data. Alternatively or additionally, in some embodiments, each or any of the display interfaces 608 is or includes, for example, a video card, video adapter, or graphics processing unit (GPU).

In some embodiments, each or any of the user input adapters 610 is or includes one or more circuits that receive and process user input data from one or more user input devices (not shown in FIG. 6) that are included in, attached to, or otherwise in communication with the computing device 600, and that output data based on the received input data to the processors 602. Alternatively or additionally, in some embodiments each or any of the user input adapters 610 is or includes, for example, a PS/2 interface, a USB interface, a touchscreen controller, or the like; and/or the user input adapters 610 facilitates input from user input devices (not shown in FIG. 6) such as, for example, a keyboard, mouse, trackpad, touchscreen, etc.

In some embodiments, the display device 612 may be a Liquid Crystal Display (LCD) display, Light Emitting Diode (LED) display, or other type of display device. In embodiments where the display device 612 is a component of the computing device 600 (e.g., the computing device and the display device are included in a unified housing), the display device 612 may be a touchscreen display or non-touchscreen display. In embodiments where the display device 612 is connected to the computing device 600 (e.g., is external to the computing device 600 and communicates with the computing device 600 via a wire and/or via wireless communication technology), the display device 612 is, for example, an external monitor, projector, television, display screen, etc.

In various embodiments, the computing device 600 includes one, or two, or three, four, or more of each or any of the above-mentioned elements (e.g., the processors 602, memory devices 604, network interface devices 606, display interfaces 608, and user input adapters 610). Alternatively or additionally, in some embodiments, the computing device 600 includes one or more of: a processing system that includes the processors 602; a memory or storage system that includes the memory devices 604; and a network interface system that includes the network interface devices 606. Alternatively, or additionally, in some embodiments, the computing device 600 includes a system-on-a-chip (SoC) or multiple SoCs, and each or any of the above-mentioned elements (or various combinations or subsets thereof) is included in the single SoC or distributed across the multiple SoCs in various combinations. For example, the single SoC (or the multiple SoCs) may include the processors 602 and the network interface devices 606; or the single SoC (or the multiple SoCs) may include the processors 602, the network interface devices 606, and the memory devices 604; and so on. The computing device 600 may be arranged in some embodiments such that: the processors 602 include a multi or single-core processor; the network interface devices 606 include a first network interface device (which implements, for example, WiFi, Bluetooth, NFC, etc.) and a second network interface device that implements one or more cellular communication technologies (e.g., 3G, 4G LTE, CDMA, etc.); the memory devices 604 include RAM, flash memory, or a hard disk. As another example, the computing device 600 may be arranged such that: the processors 602 include two, three, four, five, or more multi-core processors; the network interface devices 606 include a first network interface device that implements Ethernet and a second network interface device that implements WiFi and/or Bluetooth; and the memory devices 604 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the (e.g., the client device that accesses the system 100 and/or on which reports 108 are displayed, the server system in which pipeline 102 is implemented and/or on which the databases are stored, etc.), each of which will be referred to individually for clarity as a "component" for the remainder of this paragraph, are implemented using an example of the computing device 600 of FIG. 6. In such embodiments, the following applies for each component: (a) the elements of the 600 computing device 600 shown in FIG. 6 (i.e., the one or more processors 602, one or more memory devices 604, one or more network interface devices 606, one or more display interfaces 608, and one or more user input adapters 610), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 604 (e.g., in various embodiments, in a volatile memory device such as a RAM or an instruction register and/or in a non-volatile memory device such as a flash memory or hard disk) and all actions described herein as performed by the software modules are performed by the processors 602 in conjunction with, as appropriate, the other elements in and/or connected to the computing device 600 (i.e., the network interface devices 606, display interfaces 608, user input adapters 610, and/or display device 612); (c) alternatively or additionally, to the extent it is described herein that the component processes and/or otherwise handles data, in some embodiments, such data is stored in the memory devices 604 (e.g., in some embodiments, in a volatile memory device such as a RAM and/or in a non-volatile memory device such as a flash memory or hard disk) and/or is processed/handled by the processors 602 in conjunction, as appropriate, the other elements in and/or connected to the computing device 600 (i.e., the network interface devices 606, display interfaces 608, user input adapters 610, and/or display device 612); (d) alternatively or additionally, in some embodiments, the memory devices 602 store instructions that, when executed by the processors 602, cause the processors 602 to perform, in conjunction with, as appropriate, the other elements in and/or connected to the computing device 600 (i.e., the memory devices 604, network interface devices 606, display interfaces 608, user input adapters 610, and/or display device 612), each or any combination of actions described herein as performed by the component and/or by any software modules described herein as included within the component.

The hardware configurations shown in FIG. 6 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 6, (e) via other hardware arrangements, architectures, and configurations, and/or via combinations of the technology described in (a) through (e).

Technical Advantages of Described Subject Matter

The following paragraphs describe technical advantages that may be realized in accordance with various embodiments discussed herein.

In certain example embodiments, methods and systems are provided to resolve technical issues involved in the use of ML models, which have historically been run in batch mode or in query-response mode, together with a real-time transaction processing system. Batch mode execution or query-response execution of ML models can substantially slow transaction processing in real-time systems. Example embodiments enable one or more ML models to be executed in lockstep with the real-time transaction processing system, which substantially increases the capabilities of the transaction processing system to dynamically adapt in accordance with results obtained from the ML model.

Example embodiments utilize a plurality of processes that receive real-time transaction processing system information and various real-time feed information and write that data into a shared memory feature store from where it is read by the model executor as input to the ML model(s). The use of the feature store in shared memory to decouple the real-time transaction processing system and the ML model(s) enables each to be run at respectively suitable execution speeds and/or intervals while simultaneously providing for the ML model to be in lockstep with the transaction processing system. Additionally, in order to facilitate the lockstep operation, example embodiments provide for the system clock of the real-time system to be written to the feature store from where it is read by the execution environment to determine which operations are to be completed and to determine the interval times to execute the one or more ML models. Whereas the ML model(s) which often has a more math or processing-intensive and complex nature than real-time transaction processing system is generally slower to generate results from processing, by the use of techniques such as decoupling through the feature store or dedicated memory regions for each of a plurality of data types, example embodiments facilitate the lockstep operation of the ML model and the transaction processing system and consequently enabling the transaction processing system to operate at the real-time speeds required by the type of transaction processing.

Additional technical advantages embodied in the subject matter of this specification beyond those outlined above may be apparent to the skilled person.

Selected Terminology

The elements described in this document include actions, features, components, items, attributes, and other terms. Whenever it is described in this document that a given element is present in "some embodiments," "various embodiments," "certain embodiments," "certain example embodiments, "some example embodiments," "an exemplary embodiment," "an example," "an instance," "an example instance," or whenever any other similar language is used, it should be understood that the given element is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments.

Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an", and "the" should be read as meaning "at least one," "one or more," or the like; the term "example", which may be used interchangeably with the term embodiment, is used to provide examples of the subject matter under discussion, not an exhaustive or limiting list thereof; the terms "comprise" and "include" (and other conjugations and other variations thereof) specify the presence of the associated listed elements but do not preclude the presence or addition of one or more other elements; and if an element is described as "optional," such description should not be understood to indicate that other elements, not so described, are required.

As used herein, the term "non-transitory computer-readable storage medium" includes a register, a cache memory, a ROM, a semiconductor memory device (such as D-RAM, S-RAM, or other RAM), a magnetic medium such as a flash memory, a hard disk, a magneto-optical medium, an optical medium such as a CD-ROM, a DVD, or Blu-Ray Disc, or other types of volatile or non-volatile storage devices for non-transitory electronic data storage. The term "non-transitory computer-readable storage medium" does not include a transitory, propagating electromagnetic signal.

The claims are not intended to invoke means-plus-function construction/interpretation unless they expressly use the phrase "means for" or "step for." Claim elements intended to be construed/interpreted as means-plus-function language, if any, will expressly manifest that intention by reciting the phrase "means for" or "step for"; the foregoing applies to claim elements in all types of claims (method claims, apparatus claims, or claims of other types) and, for the avoidance of doubt, also applies to claim elements that are nested within method claims. Consistent with the preceding sentence, no claim element (in any claim of any type) should be construed/interpreted using means plus function construction/interpretation unless the claim element is expressly recited using the phrase "means for" or "step for."

Whenever it is stated herein that a hardware element (e.g., a processor, a network interface, a display interface, a user input adapter, a memory device, or other hardware element), or combination of hardware elements, is "configured to" perform some action, it should be understood that such language specifies a physical state of configuration of the hardware element(s) and not mere intended use or capability of the hardware element(s). The physical state of configuration of the hardware elements(s) fundamentally ties the action(s) recited following the "configured to" phrase to the physical characteristics of the hardware element(s) recited before the "configured to" phrase. In some embodiments, the physical state of configuration of the hardware elements may be realized as an application specific integrated circuit (ASIC) that includes one or more electronic circuits arranged to perform the action, or a field programmable gate array (FPGA) that includes programmable electronic logic circuits that are arranged in series or parallel to perform the action in accordance with one or more instructions (e.g., via a configuration file for the FPGA). In some embodiments, the physical state of configuration of the hardware element may be specified through storing (e.g., in a memory device) program code (e.g., instructions in the form of firmware, software, etc.) that, when executed by a hardware processor, causes the hardware elements (e.g., by configuration of registers, memory, etc.) to perform the actions in accordance with the program code.

A hardware element (or elements) can therefore be understood to be configured to perform an action even when the specified hardware element(s) is/are not currently performing the action or is not operational (e.g., is not on, powered, being used, or the like). Consistent with the preceding, the phrase "configured to" in claims should not be construed/interpreted, in any claim type (method claims, apparatus claims, or claims of other types), as being a means plus function; this includes claim elements (such as hardware elements) that are nested in method claims.

Additional Applications of Described Subject Matter

Although process steps, algorithms or the like, including without limitation with reference to FIGS. 2, 3 and 4, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A system comprising:
    a memory comprising a feature store, wherein the feature store comprises a plurality of predefined memory regions each of which is configured to store data of a respective data type of a plurality of data types; and
    a processing system comprising at least one processor and being configured to perform operations comprising:
        running a first process configured to receive data from a real-time transaction engine and to store the received data in the feature store in accordance with a data type of the received data;
        running a second process configured to control execution of machine learning model based on a clock signal obtained from the feature store, wherein the machine learning model is configured to use data stored in one or more of the predefined memory regions of the feature store as input;
        running a third process configured to receive result data generated by the machine learning model and to provide the result data to the real-time transaction engine,
    wherein the first process is configured to extract data of a first set of data types from a core data stream received from the transaction processing engine and to write the extracted data of each data type of the first set of data types in respectively different first predefined memory regions of the plurality of memory regions; and
        running a fourth process configured to extract data of a second set of data types from a from a second data stream and to write the extracted data of each data type of the second set of data types to respectively different second predefined memory regions of the plurality of memory regions.

2. The system according to claim 1, wherein the core data stream comprises the clock signal indicating the current clock of the real-time transaction engine, wherein the first process is further configured to extract the clock signal from the core data stream and to write the extracted clock signal to a designated clock memory region from the plurality of predefined memory regions.

3. The system according to claim 1, wherein the third process is further configured to rate limit messages from the machine learning model to the real-time transaction engine.

4. The system according to claim 1, wherein the memory comprising the feature store is a shared memory enabled for simultaneous writing by the first process and the fourth process in respectively different memory regions of the plurality of memory regions.

5. The system according to claim 1, wherein the feature store comprises an entire dynamic state of the real-time transaction engine defined for use in execution of the machine learning model.

6. The system according to claim 1, wherein the processing system is further configured to perform operations comprising running a fifth process configured to read the time signal from a designated memory region in the feature store, and wherein the second process is configured to, in response to a signal from the fifth process based on the time signal, control execution of one or more machine learning models.

7. The system according to claim 6, wherein the second process and/or the fifth process is further configured to, in response to detecting a predetermined condition of the time signal, read one or more of the predefined memory regions of the feature store to obtain input data, controlling the execution of the one or more machine learning models using the input data, and providing results of the execution to the third process.

8. The system according to claim 7, wherein the predetermined condition is an expiration of a predetermined time interval.

9. The system according to claim 6, wherein the second process or the fifth process is further configured to poll the feature store according to a predetermined time interval, and in response to detecting a predetermined event condition, read one or more of the predefined memory regions of the feature store to obtain input data, control execution of the one or more machine learning models using the input data, and provide results of the execution to the third process.

10. The system according to claim 9, wherein the predetermined event condition is an occurrence of an event of one or more predetermined event types, wherein the occurrence is determined in accordance with presence of data in a designated memory region for a data type that corresponds to the one or more event types.

11. The system according to claim 6, wherein the first process is further configured to, in response to detecting a first event type in the core data stream, cause the second process and/or the fifth process to: read one or more of the predefined memory regions of the feature store to obtain input data; control execution of the one or more machine learning models using the input data; and provide results of the execution to the third process.

12. The system according to claim 11, wherein the one or more memory regions are selected based on the detected first event type.

13. The system according to claim 1, comprising a first instance and a second instance of the feature store, a first instance and a second instance of the first process, a first instance and a second instance of the second process, and further comprising a first instance and a second instance of a third process configured to receive result data generated by the machine learning model and to provide the result data to the real-time transaction engine based on a value of a state configuration, wherein the first instance and the second instance of the first process, the first instance and the second instance of the second process and the first instance and the second instance of the third process execute concurrently in the processing system, and wherein the state configuration in the first instance of the third process is set to primary and the state configuration in the second instance of the third process is set to secondary.

14. The system according to claim 1, wherein the processing system is further configured to, in response to detecting a failure of the first instance of the third process, automatically setting the second instance of the third process to primary and setting the first instance of the third process as secondary.

15. The system according to claim 1, wherein the second process is configured to control periodic execution of the machine learning model to maintain a state of the machine learning model in lockstep with a state of the real-time transaction engine.

16. The system according to claim 15, wherein a processor executing the machine learning model executes has a different execution speed than a processor executing the real-time transaction engine.

17. A method comprising:
running, on a processing system comprising at least one processor, a first process configured to receive data from a real-time transaction engine and to store the received data in a feature store in accordance with a data type of the received data, wherein the feature store comprises a plurality of predefined memory regions each of which is configured to store data of a respective data type of a plurality of data types; and
running a second process configured to control execution of machine learning model based on a clock signal obtained from the feature store, wherein the machine learning model is configured to use data stored in one or more of the predefined memory regions of the feature store as input;
running a third process configured to receive result data generated by the machine learning model and to provide the result data to the real-time transaction engine, wherein the first process is configured to extract data of a first set of data types from a core data stream received from the transaction processing engine and to write the extracted data of each data type of the first set of data types in respectively different first predefined memory regions of the plurality of memory regions; and
running a fourth process configured to extract data of a second set of data types from a from a second data stream and to write the extracted data of each data type of the second set of data types to respectively different second predefined memory regions of the plurality of memory regions.

18. The method according to claim 17, wherein the feature store comprises an entire dynamic state of the real-time transaction engine defined for use in execution of the machine learning model.

19. A non-transitory computer readable storage medium storing computer instructions that, when executed by at least one processor of a processing system, causes that the processing system to perform operations comprising:
running, on a processing system comprising at least one processor, a first process configured to receive data from a real-time transaction engine and to store the received data in a feature store in accordance with a data type of the received data, wherein the feature store comprises a plurality of predefined memory regions each of which is configured to store data of a respective data type of a plurality of data types; and
running a second process configured to control execution of machine learning model based on a clock signal obtained from the feature store, wherein the machine learning model is configured to use data stored in one or more of the predefined memory regions of the feature store as input;
running a third process configured to receive result data generated by the machine learning model and to provide the result data to the real-time transaction engine, wherein the first process is configured to extract data of a first set of data types from a core data stream received from the transaction processing engine and to write the extracted data of each data type of the first set of data types in respectively different first predefined memory regions of the plurality of memory regions; and running a fourth process configured to extract data of a second set of data types from a from a second data stream and to write the extracted data of each data type of the second set of data types to respectively different second predefined memory regions of the plurality of memory regions.

\* \* \* \* \*